US006263296B1

(12) United States Patent
Nakamura

(10) Patent No.: US 6,263,296 B1
(45) Date of Patent: Jul. 17, 2001

(54) METHOD FOR PREDICTING PRINTING DENSITY IN STENCIL PRINTING AND DEVICE FOR THE SAME

(75) Inventor: Yasuo Nakamura, Inashiki-gun (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 09/235,555

(22) Filed: Jan. 22, 1999

(30) Foreign Application Priority Data

Jan. 23, 1998 (JP) ........................................ 10-26762

(51) Int. Cl.[7] ........................................ G01N 9/00

(52) U.S. Cl. ........................................ 702/137; 101/119

(58) Field of Search ........................................ 702/137, 1, 85, 702/127; 101/118, 119, 116, 129; 73/861.41; 358/504

(56) References Cited

U.S. PATENT DOCUMENTS

| | | | |
|---|---|---|---|
| 4,791,866 | * 12/1988 | Kanno et al. | 101/118 |
| 5,251,567 | * 10/1993 | Fuwa | 101/128 |
| 5,476,043 | * 12/1995 | Okuda et al. | 101/483 |
| 5,517,913 | * 5/1996 | Oshio et al. | 101/119 |

FOREIGN PATENT DOCUMENTS

| | | |
|---|---|---|
| 62-127276 | 6/1987 | (JP) . |
| 5-286221 | 11/1993 | (JP) . |
| 6-155880 | 6/1994 | (JP) . |
| 7-132671 | 5/1995 | (JP) . |

OTHER PUBLICATIONS

Patent Abstract of Japan, vol. 018, No. 479, Sep. 7, 1994.

Patent Abstracts of Japan vol. 018, No. 479 (M–1669), Sep. 7, 1994 & JP 06 155880 A (Riso Kagaku Corp), Jun. 3, 1994.

Patent Abstracts of Japan vol. 017, No. 198 (M–1398), Apr. 19, 1993 & JP 04 344283 A (Omron Corp), Nov. 30, 1992.

Patent Abstracts of Japan vol. 018, No. 479 (M–1669), Sep. 7, 1994 & JP 06 155882 A (Riso Kagaku Corp), Jun. 3, 1994.

* cited by examiner

*Primary Examiner*—Marc S. Hoff
*Assistant Examiner*—Edward Raymond
(74) *Attorney, Agent, or Firm*—Pillsbury Winthrop LLP

(57) ABSTRACT

A method for predicting printing density for use in a stencil printing in which an ink is transferred from a rotated printing drum to a printing sheet through a perforated stencil, by pressing the printing sheet and the printing drum against each other, is provided. The method comprises (a) a first step of measuring printing densities (OD) on at least two copies of print at corresponding printed portions thereof, the copies of print being obtained under different conditions of F/f, in which F is a pressing force at which the printing sheet is pressed to the drum and f is a rotation speed of the drum, (b) a second step of statistically processing the printing densities measured in the first step to obtain a function of printing density and F/f value, and (c) a third step of calculating a printing density at a desired pressing force and a desired rotation speed based on the function obtained in the second step. The function may be $OD=V\times\sqrt{(F/f)}+W$, in which V and W means constants that may be obtained by least-squares method.

18 Claims, 10 Drawing Sheets

STEP 580
EXECUTE TRIAL PRINTING ?
YES
NO
STEP 590
SET PRINTING SPEED
STEP 600
DETERMINE PRESSING FORCE
STEP 610
SET NUMBER OF COPIES Q FOR TRIAL PRINTING
STEP 620
START TRIAL PRINTING ?
YES
N→0
B
NO
D
FINISH PREDICTING MODE ?
YES
RETURN
STEP 630
NO

STEP 780
DISPLAY POSSIBLE RANGE OF PRINTING SPEED
F
STEP 790
EXECUTE TRIAL PRINTING ?
YES N→0
NO
STEP 800
SET PRINTING SPEED
STEP 810
DETERMINE PRESSING FORCE
STEP 820
SET NUMBER OF COPIES Q FOR TRIAL PRINTING
STEP 830
START TRIAL PRINTING ?
YES N→0
NO
F
B
STEP 850
FINISH PREDICTING MODE ?
YES
NO
RETURN

METHOD FOR PREDICTING PRINTING DENSITY IN STENCIL PRINTING AND DEVICE FOR THE SAME

TECHNICAL FIELD

The present invention relates to a method for predicting a printing density under a desired printing condition and a method for predicting a printing condition under which a desired printing density is achieved, and also relates to devices for the same.

BACKGROUND OF THE INVENTION

Well known in the art is a stencil printing device in which a perforated stencil sheet is wound around a circumferential surface of a cylindrical printing drum with an ink supplied thereto, and in which the ink is transferred from the printing drum to a printing sheet through the perforated stencil sheet by pressing the printing sheet to the printing drum while the drum is rotated.

In a stencil printing above, it has been proposed in Japanese patent laid open publication (Kokai) No. 62-127276 that the printing density of an image to be printed on a printing sheet is variably set by variably setting a pressing force to be applied to the printing sheet against the printing drum, in accordance with the printing density information given by a means for setting printing density information, for instance, a printing density set up key provided on an operation panel.

Furthermore, since the printing density in stencil printing changes with printing speed, Japanese patent laid open publication (Kokai) No. 06-155880 has already proposed a method for implementing stencil printing at a desired density irrespective of the change in printing speed. This method comprises variably setting a pressing force applied to the printing sheet against the printing drum, in accordance with printing speed information given by a means for setting printing speed information, for instance, a printing speed set up key provided on an operation panel.

With recent diversification in quality of printing paper and originals, there is a demand on a stencil printing device which can more widely and finely control printing density. Particularly, in case stencil printing is performed using a photograph as an original, reproduction of a wide range of gradation is desired; hence, the printing density must be set properly in accordance with quality of printing paper to obtain a desired gradation range. Furthermore, in order to reproduce a desired color hue in case of multicolor printing, density of each of colors to be mixed together should be accurately controlled. Besides, in case printing is overlaid on a sheet in the same color, printed product would be messy in appearance if printing density of the second printing is different from that of the first printing. Thus, the printing densities of the first and second printing must be matched accurately.

In case of the conventional printers described above, however, even if the same printing density is set by the printing density set up key of the printer, actual printing density differs depending on printing paper because the printing density is largely influenced by quality of printing paper. Moreover, degree of pressing force that compensates for a change in printing speed to obtain the same printing density had to be determined only by experience. Thus, to obtain the same printing density in the actual printing performed at a high speed as that realized in trial printing carried out at a lower printing speed, trial printing had to be carried out repeatedly, and much experience was necessary.

Needless to say, it has been furthermore difficult to accurately predict printing densities at various combinations of printing speed and pressing force.

BRIEF SUMMARY OF THE INVENTION

In view of the above problems, an object of the present invention is to provide a method and a device for predicting printing density in stencil printing, which are capable of, not only finely and widely varying printing density under various printing conditions, but also accurately predicting printing density at a desired printing speed and a desired pressing force, or displaying a printing condition that provides a desired printing density, by merely performing several times of trial printing using printing sheets to be printed.

As a result of the present inventor's intensive studies under the above object, it has been found that quantity of ink transferred to paper, i.e., printing density, depends on a value of F/f (where F is a pressing force at which a printing sheet is pressed to a printing drum, and f is a rotation speed of the drum), and more particularly, that the quantity is approximately proportional to the value of $\sqrt{(F/f)}$. This means that, even if rotation speed of the drum is varied, the same printing density can be obtained by performing stencil printing using a pressing force which yields the same value of F/f. Thus, the present inventor has found that a function for predicting a printing density can be obtained by measuring printing densities under conditions of different F/f as samples, followed by statistically processing the thus-obtained data on printing density, and thus it is possible to predict a printing density under a desired printing condition without undue times of trial printings.

In accordance with one aspect of the present invention, there is provided, in a stencil printing in which a perforated stencil sheet is wound around a circumferential surface of a printing drum to which an ink is supplied, and the ink is transferred from the printing drum to a printing sheet through the perforated stencil sheet by pressing the printing sheet and the printing drum against each other while the drum is rotated, a method for predicting a printing density which comprises:

(a) a first step of measuring printing densities on at least two copies of print at corresponding printed portions thereof, said copies of print being obtained under different conditions of F/f, in which F is a pressing force at which the printing sheet is pressed to the drum and f is a rotation speed of the drum, (b) a second step of statistically processing said printing densities measured in the first step, in order to obtain a function of printing density and F/f value, and (c) a third step of calculating a printing density at a desired pressing force and a desired rotation speed based on the function obtained in the second step.

In accordance with another aspect of the present invention, there is provided, in a stencil printing in which a perforated stencil sheet is wound around a circumferential surface of a printing drum to which an ink is supplied, and the ink is transferred from the printing drum to a printing sheet through the perforated stencil sheet by pressing the printing sheet and the printing drum against each other while the drum is rotated, a method for calculating a printing condition, which comprises:

(a) a first step of measuring printing densities on at least two copies of print at corresponding printed portions thereof, said copies of print being obtained under different conditions of F/f, in which F is a pressing force at which the printing sheet is pressed to the drum and f is a rotation speed of the drum, (b) a second step of statistically processing said printing densities measured in the first step, in order to obtain a function of printing density and F/f value, and (c) a third step of calculating a combination of a pressing force and a rotation speed at a desired printing density based on the function obtained in the second step.

According to a yet other aspect of the present invention, there is provided a device for predicting a printing density for use in stencil printing in which a perforated stencil sheet is wound around a circumferential surface of a printing drum to which an ink is supplied, and the ink is transferred from the printing drum to a printing sheet through the perforated stencil sheet by pressing the printing sheet and the printing drum against each other while the drum is rotated, which comprises (a) a first means for measuring printing densities on at least two copies of print at corresponding printed portions thereof, said copies of print being obtained under different conditions of F/f, in which F is a pressing force at which the printing sheet is pressed to the drum and f is a rotation speed of the drum, (b) a second means for statistically processing said printing densities measured in the first means, in order to obtain a function of printing density and F/f value, and (c) a third means for calculating a printing density at a desired pressing force and a desired rotation speed based on the function obtained in the second means.

In accordance with a still other aspect of the present invention, there is provided a device for calculating a printing condition for use in stencil printing in which a perforated stencil sheet is wound around a circumferential surface of a printing drum to which an ink is supplied, and the ink is transferred from the printing drum to a printing sheet through the perforated stencil sheet by pressing the printing sheet and the printing drum against each other while the drum is rotated, which comprises (a) a first means for measuring printing densities on at least two copies of print at corresponding printed portions thereof, said copies of print being obtained under different conditions of F/f, in which F is a pressing force at which the printing sheet is pressed to the drum and f is a rotation speed of the drum, (b) a second means for statistically processing said printing densities measured in the first means, in order to obtain a function of printing density and F/f value, and (c) a third means for calculating a combination of a pressing force and a rotation speed at a desired printing density based on the function obtained in the second means.

According to a further aspect of the present invention, there is provided a computer program storage medium containing a program for predicting a printing density, for use in a stencil printing in which a perforated stencil sheet is wound around a circumferential surface of a printing drum to which an ink is supplied, and the ink is transferred from the printing drum to a printing sheet through the perforated stencil sheet by pressing the printing sheet and the printing drum against each other while the drum is rotated, in which said program comprises the following steps of (a) measuring printing densities on at least two copies of print at corresponding printed portions thereof, said copies of print being obtained under different conditions of F/f, in which F is a pressing force at which the printing sheet is pressed to the drum and f is a rotation speed of the drum, (b) statistically processing said printing densities measured in the step (a), in order to obtain a function of printing density and F/f value, and (c) calculating a printing density at a desired pressing force and a desired rotation speed based on the function obtained in the step (b).

In accordance with a yet further aspect of the present invention, there is provided a computer program storage medium containing a program for calculating a printing condition, for use in a stencil printing in which a perforated stencil sheet is wound around a circumferential surface of a printing drum to which an ink is supplied, and the ink is transferred from the printing drum to a printing sheet through the perforated stencil sheet by pressing the printing sheet and the printing drum against each other while the drum is rotated, in which said program comprises the following steps of (a) measuring printing densities on at least two copies of print at corresponding printed portions thereof, said copies of print being obtained under different conditions of F/f, in which F is a pressing force at which the printing sheet is pressed to the drum and f is a rotation speed of the drum, (b) statistically processing said printing densities measured in the step (a), in order to obtain a function of printing density and F/f value, and (c) calculating a combination of a pressing force and a rotation speed at a desired printing density based on the function obtained in the step (b).

In the present invention, the rotation speed f (rpm) of the printing drum is, in general, equivalent to a frequency per minute of repeated pressing at an arbitrarily fixed point of the printable outer circumferential surface of the printing drum. Thus, in an ordinary printer in which a piece of printing paper is fed per rotation of the drum, the rotation speed f (rpm) is equivalent to the number of copies finished in one minute. However, in case plural pieces of printing paper are fed per rotation of the drum, or in case only one piece of printing paper is fed while the drum rotates more than one time, the rotation speed of the drum does not necessarily agree with the printing speed, namely the number of copies finished in one minute. Furthermore, in case rotation of the drum is not constant (for instance, where the drum accelerates, decelerates or stops during one rotation), rotation speed f (rpm) of the drum meant by the present invention is derived from a surface speed of the drum at a fixed point, which can be converted into a rotation speed f (rpm).

In the present invention, any method for pressing a paper and the drum of the stencil printer against each other may be used without any limitations. Paper can be pressed by, for example, a method comprising pressing the paper from its back against the outer circumferential surface of the drum by using a press roller, or a method comprising pressing the outer circumferential surface of the drum against the surface of the paper by utilizing the rigidity of the drum itself. Furthermore, a method disclosed in Japanese patent laid open publication (Kokai) No. 07-132671 may be used, in which the drum itself is made from a flexible member, and a press roller disposed inside the drum is pushed outwards to radially expand the drum, thereby pressing the outer circumferential surface of the drum against the paper. The pressing force can be generated by any of the known means, for instance, a spring, a solenoid, an air cylinder, hydraulic pressure or the like.

In accordance with the present invention, the higher, the pressing pressure applied to the paper against the drum is, the greater, the value of F/f becomes, and the higher, the rotation speed of the drum is, the smaller, the value of F/f is. That is, F/f increases with an increase in force of pushing the ink out of the drum, and decreases with a decrease in a time during which the ink is pushed out of the drum. From this, F/f can be taken as an index representing easiness of transfer of the ink from a drum to a printing sheet. In fact, when prints obtained under printing conditions of different F/f values using the same perforated stencil sheet were observed under a microscope at corresponding printed portions, it has been found that an area of each printed dot becomes larger when printing is performed under a condition of a larger F/f value. It has been understood from this fact that as the value of F/f is increased, a proportion of the printed dot area to the surface area of the printed portion of the printing sheet is increased, thereby increasing printing density. Thus, it has been found that the mutual relationship between the printing density and the value of F/f can be clarified by statistically processing the relation between them.

Furthermore, as a result of the extensive study of the present inventor on the relation between the printing density and the printing condition, i.e., the value of F/f, it has been found that the relation between the printing density (OD) and the printing condition (F/f) is well expressed by the following equation:

$$OD=V\times\sqrt{(F/f)}+W$$

In the equation above, V and W each represent constants which depend on state of perforations of a stencil sheet, quality of a printing sheet, and viscosity and a coloring material of an ink. They can be determined from the relation between F/f and OD obtained in trial printing, by a statistical method such as the least-squares method.

Hence, by using the equation above, a printing density (OD) of a particular portion of a print can be predicted based on a combination of a pressing force F and a rotation speed f of the drum.

In case a targeted printing density is set, the printing condition $\sqrt{(F/f)}$ necessary to obtain the targeted printing density can be predicted by use of the following equation:

$$\sqrt{(F/f)}=(OD-W)/V$$

BRIEF DESCRIPTION OF THE DRAWINGS

Hereinafter, the present invention will be described in more detail with reference to the appended drawings, in which.

DETAILED DESCRIPTION OF THE PREFERRED EMBODIMENTS

Figure 1:
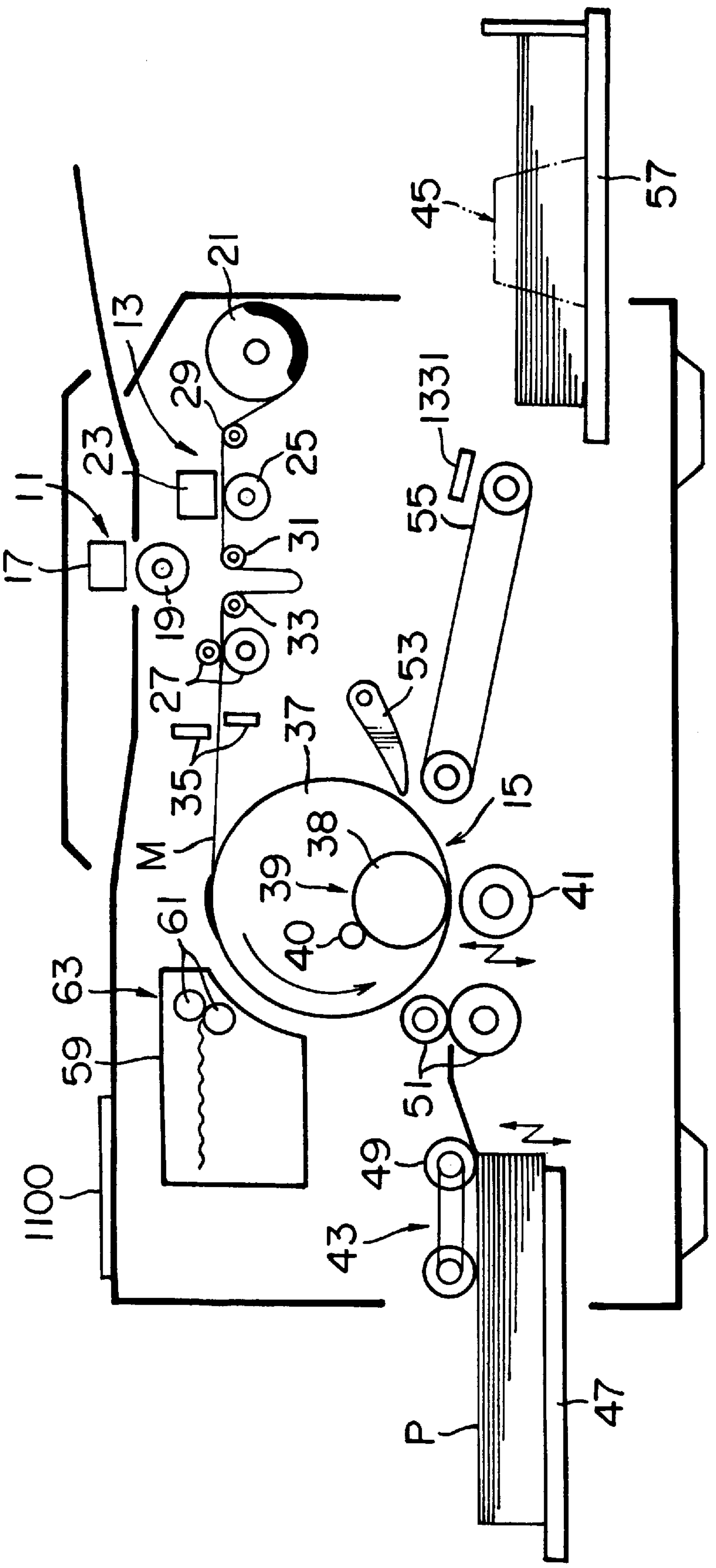
FIG. 1 is a side cross sectional view which schematically shows the inner structure of an embodiment of a stencil printing device according to the present invention.

FIG. 1 shows a preferred embodiment of the stencil printing device according to the present invention, which is equipped with a plate making function. This stencil printing device comprises an original reading unit 11, a plate making unit 13, and a printing unit 15.

The original reading unit 11 essentially consists of an image scanner, and comprises a line image sensor 17 for reading an original image of an original sheet conveyed in a secondary scanning direction, and an original sheet feeding roller 19. In the present embodiment, the original reading unit 11 is used for reading the image of the original, and may be used as a device for measuring a printing density of prints printed by the printing device itself. Alternatively, a reflection densitometer and the like may be separately provided as a device for measuring the printing density of the prints, so that measured values are input by keying or stored automatically.

The plate making unit 13 comprises a stencil sheet roll unit 21, a thermal printing head 23 consisting of a plurality of dot-like heat generating elements arranged in a lateral row, master plate sheet feeding rollers 25 and 27, master plate sheet guide rollers 29, 31 and 33, and a master plate sheet cutter 35. The dot-like heat generating elements in the thermal printing head 23 are selectively and independently activated so that a desired thermal perforation may be carried out in a dot-matrix way in the master plate sheet M that is heat sensitive, as a plate making process, and the master plate sheet cutter 35 cuts the stencil master plate sheet M after the latter has been perforated.

The printing unit 15 comprises a cylindrical printing drum 37 made of a perforated metal plate, a mesh structure or an otherwise ink permeable porous structure, an ink supplying unit 39 essentially consisting of a squeegee roller 38 and a doctor roller 40 disposed inside the printing drum 37, and a press roller 41. The outer circumferential surface of the printing drum 37 is adapted to be wound with a stencil master plate sheet M that has been processed and cut into a master plate.

On one side of the printing unit 15 is provided a paper feeding unit 43, and on the other side of the printing unit 15 is provided a paper ejecting unit 45.

The paper feeding unit 43 comprises a paper feeding table 47 on which a stack of printing paper P is placed, pick up roller 49 for picking up the printing paper P on the paper feeding table 47 sheet by sheet, and timing rollers 51 for delivering the printing paper P to the nip between the printing drum 37 and the press roller 41, The paper ejecting unit 45 comprises a peeling claw 53 for removing the printing paper from the printing drum 37, an ejected paper feeding belt 55, and an ejected paper table 57 for stacking up the printed printing paper. Furthermore, as shown in FIG. 1, a printing density sensor 1331 may be provided as a device for measuring the printing density of the prints printed by the printing device itself.

On one side of the printing unit 15 is provided a master plate ejecting unit 63 comprising master plate ejecting rollers 61 for peeling off the used stencil master plate sheet M from the printing drum 37 and delivering it into an ejected master plate box 59.

In this stencil printing device, printing ink of a desired color is supplied by the ink supplying unit 39 into the inner surface of the printing drum 37 while the printing drum 37 is rotated counterclockwise in the drawing around its central axial line by rotative drive means not shown in the drawings. Printing paper P is delivered to the nip between the press roller 41 and the printing drum 37 after being fed by the paper feed timing rollers 51 from the left to right in synchronism with the rotation of the printing drum 37 at an appropriate timing. The printing paper P is thus pressed upon the printing drum 37 by the press roller 41 onto the stencil master plate sheet M mounted on the outer circumferential surface of the printing drum, and a stencil printing is carried out on the printing paper P by using the printing ink of the desired color.

Figure 2:
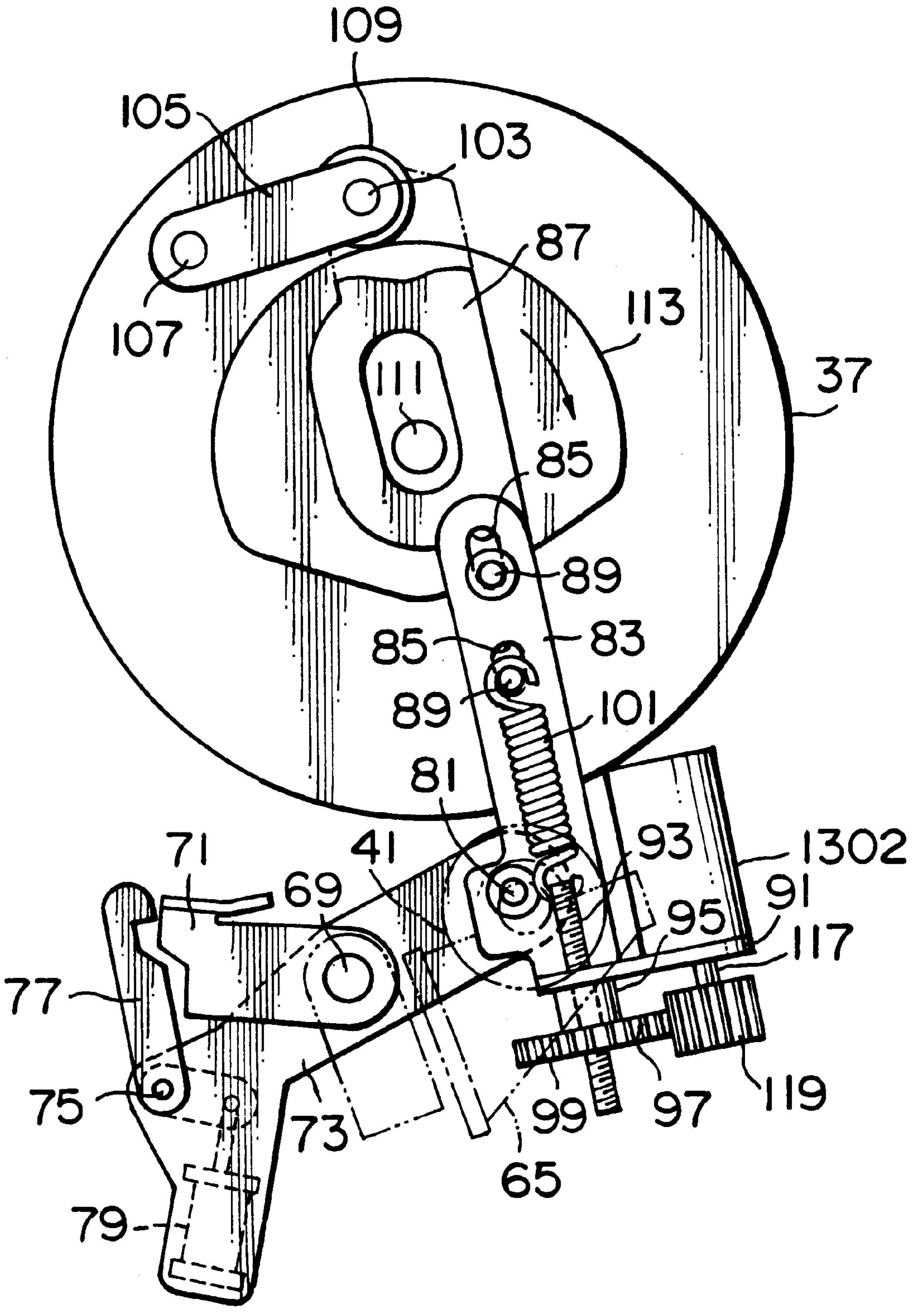
FIG. 2 is a side view of a drive unit used for the press roller shown in FIG. 1.

FIG. 2 shows the drive unit for the press roller 41. The press roller 41 is supported by a bracket 65, extending in the axial direction of the printing drum 37, so as to be rotatable around its central axial line, and the bracket 65 is in turn fixedly secured to a press shaft 69 rotatably supported by a fixed member or frame not show in the drawings. Thus, the press roller 41 is vertically swingable around the press shaft 69, and can move between a retracted position spaced from the outer circumferential surface of the printing drum 37 and a position for pressing action engaged upon the outer circumferential surface of the printing drum 37. The press shaft 69 carries a press drive lever 71 fixedly mounted thereon, and rotatably supports a press drive plate 73.

A hook member 77 is pivotally supported on the press drive plate 73 by means of a pivot shaft 75, and selectively engages with the press drive lever 71 by being rotatively driven by a solenoid 79 mounted on the press drive plate 73 for selectively engaging the press drive lever 71 with the press drive plate 73.

An end of a first link member 83 is pivotally connected to an end of the press drive plate 73 by means of a pivot shaft 81. The first link member 83 is provided with a pair of slots 85 extending in the same direction, and these slots 85 receive pins 89 of a second link member 87. Thus, the first link member 83 and the second link member 87 are connected with each other so as to be relatively moveable in the lengthwise direction or vertically as seen in FIG. 2 within the range permitted by the slots 85.

The lower end of the first link member 83 is provided with a bent flange piece 91 through which an adjust screw 93 is passed so as to be adjustable in the direction of the reciprocating movement of the first link member 83. The adjust screw 93 threads with a nut member 99 provided with outer teeth 97 in the manner of a spur gear and supported by the lower surface of the bent flange piece 91 by way of a collar 95 against a thrust force, and the upper end of the adjust screw 93 is connected to an end of a tensile coil spring 101.

The adjust screw 93 is thus prevented from rotating by being engaged by the one end of the tensile coil spring 101, and is axially displaced with respect to the first link member 83 by the rotation of the nut member 99.

The tensile coil spring 101 is engaged by one of the pins 89 at its other end, thus urging the first link member 83 upwards relative to the second link member 87, or in other words urging the press drive plate 73 in counter clockwise direction in FIG. 2 around the press shaft 69 to press the press roller 41 onto the outer circumferential surface of the printing drum 37.

The second link member 87 is pivotally connected to a free end portion of a cam lever 105 by a pivot shaft 103. The cam lever 105 is rotatably supported on a frame not shown in the drawings by a support shaft 107. The cam lever 105 rotatably supports a cam follower roller 109 in a freely rotatable manner. The cam follower roller 109 engages with a press cam 113 mounted on a main shaft 111. A frame not shown in the drawings rotatably supports the main shaft 111.

The press cam 113 rotates in synchronism with the printing drum 37, and is provided with a cam profile which moves the press roller 41 to its retracted position to avoid the interference between the press roller 41 and a clamp unit when the clamp unit is located in a position corresponding to the press roller 41. The clamp unit is not shown in the drawings, but disposed on an outer circumferential surface of the printing drum 37 to clamp an end of a stencil master plate sheet wound around the drum as in conventional stencil printing machines.

The bent flange piece 91 carries an electric motor 1302 for adjusting the pressing force, and a drive gear 119 is fixedly secured to an output shaft 117 of the electric motor 1302. The drive gear 119 meshes with the outer teeth 97 of the nut member 99 for transmitting the rotation of the output shaft 117 of the electric motor 1302 for adjusting the pressing force.

In this press roller drive unit, the rotation of the printing drum 37 causes the press cam 113 to rotate in the clockwise direction as seen in FIG. 2, and this rotation in turn causes a substantially vertical reciprocating movement of the second link member 87 which is transmitted to the first link member 83 via the tensile coil spring 101. The reciprocating movement of the first link member 83 causes the press drive plate 73 to angularly reciprocate around the press shaft 69, and because the hook member 77 is moved into engagement with the press drive lever 71 by the solenoid 79, the reciprocating movement of the press drive plate 73 is transmitted to the press shaft 69. Thus, the reciprocating angular movement of the press shaft 69 causes the press roller 41 to vertically swing around the press shaft 69 so that the press roller 41 may move between the retracted position spaced from the outer circumferential surface of the printing drum 37 and the pressing position where the roller 41 is pressed against the outer circumferential surface of the printing drum 37.

The movement of the press roller 41 to the pressing position is effected by the second link member 87 being lifted, by this movement being transmitted to the first link member 83 through tensioning of the tensile coil spring 101, and by the press drive plate 73 being rotated in counter clockwise direction as seen in FIG. 2 around the press shaft 69 of the press drive plate 73. Thus, the press roller 41 is pressed against the outer circumferential surface of the printing drum 37 with the printing paper P interposed therebetween, thereby restricting any further rotation of the press drive plate 73 in counter clockwise direction as seen in FIG. 2 around the press shaft 69. The second link member 87 is further lifted until the second link member 87 moves relative to the first link member 83 and the tensile coil spring 101 is extended. As a result, the spring force of the stretched tensile coil spring 101 presses the press roller 41 on the outer circumferential surface of the printing drum 37 with printing paper P interposed therebetween, and the magnitude of the pressing force is determined by this spring force.

For adjusting the pressing force, the electric motor 1302 for the adjustment of the pressing force is activated, and the drive gear 119 is rotated. The rotation of the driver gear 119 is transmitted to the nut member 99, and the rotation of the nut member 99 causes the adjust screw 93 to move axially relative to the first link member 83, thereby changing the position of the adjust screw 93 relative to the first link member 83. As a result, the point of engagement between the tensile coil spring 101 and the adjust screw 93 moves axially relative to the first link member 83, and this displacement causes a change in the length of the tensile coil spring 101, and hence its preset spring force. The change in the preset force of the tensile coil spring 101 changes the pressure, that is, the pressing force by which the press roller 41 is pressed against the outer circumferential surface of the printing drum 37 as described above. It can be clearly understood that such a means as a solenoid, an air cylinder and a hydraulic pressure is also usable as a means for generating the pressing force.

As described in Japanese patent publication (Kokoku) No. 62-28757, the printing drum 37 for use in the present embodiment is supported on a movable support frame as a unit together with an ink bottle accommodating printing ink therein, an ink delivery pump for drawing printing ink from the ink bottle and delivering it to the supplying unit 39, and a drive motor for the ink delivery pump. The entire unit can be replaceably loaded into the body of the stencil printing device.

Figure 3:
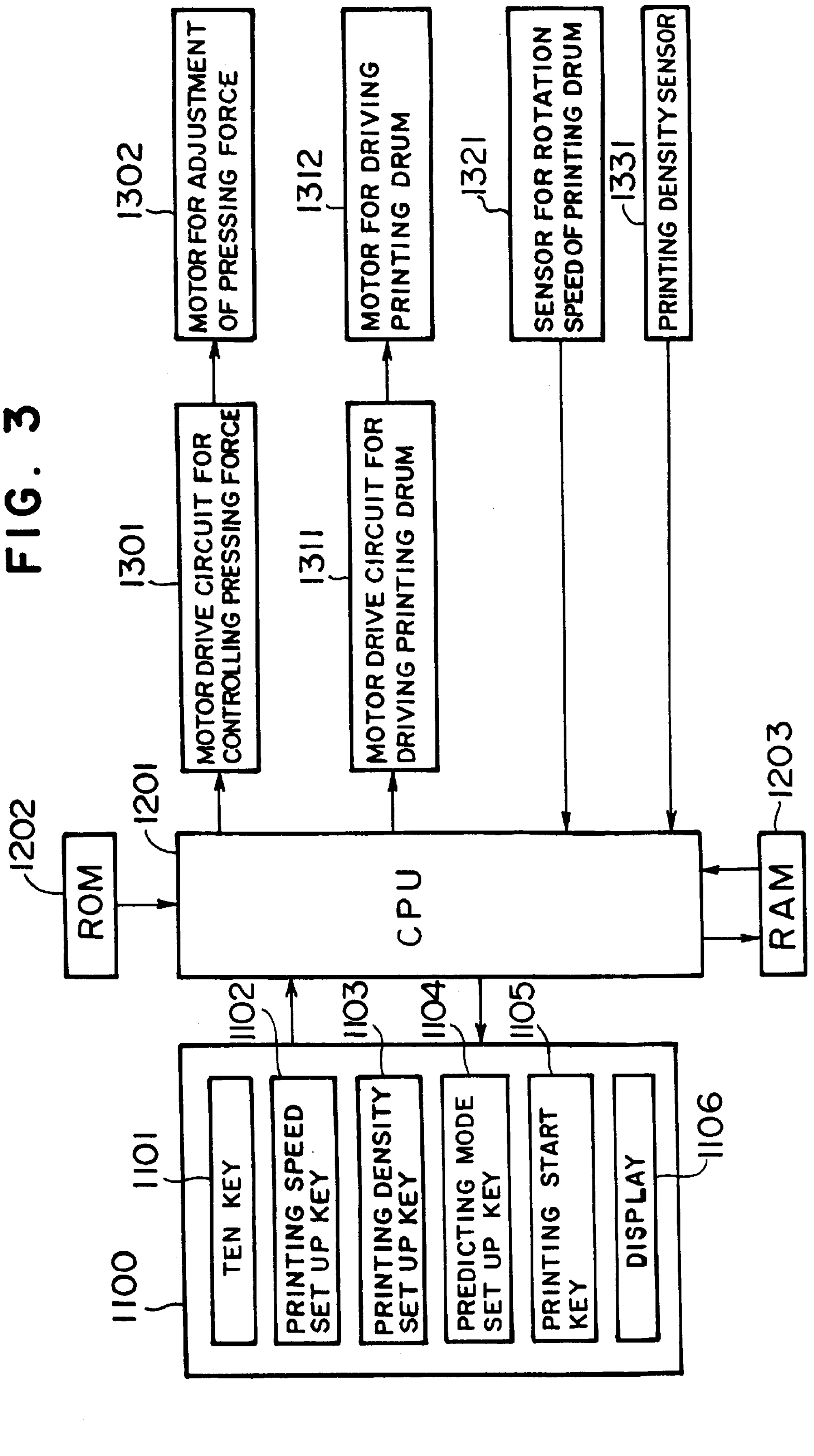
FIG. 3 is a block diagram showing an embodiment of the control unit of a stencil printing device according to the present invention.
Figure 4A:
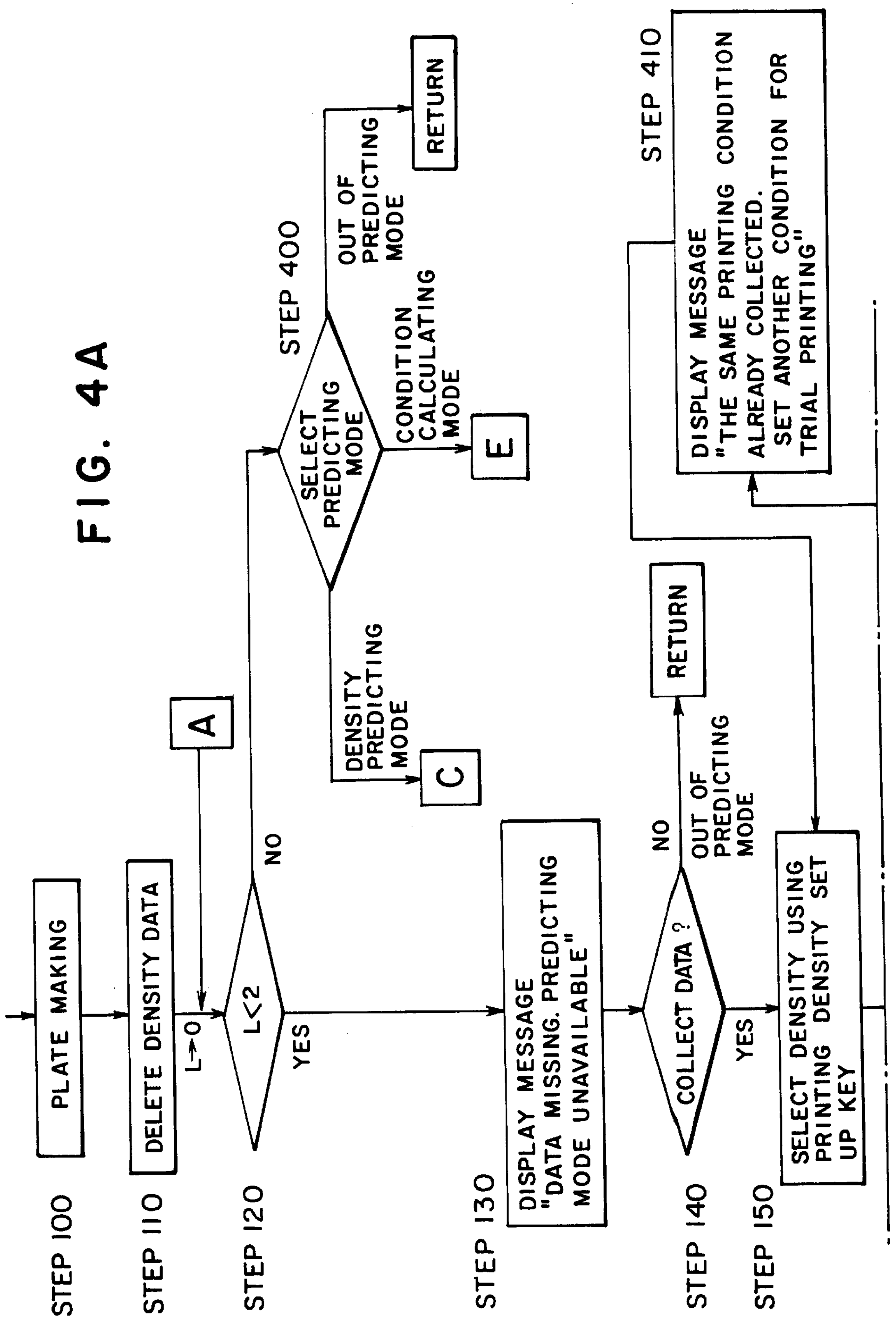
FIG. 4 is a flow chart showing a control operation in the method and the device according to the present invention.
Figures 4, 4B:
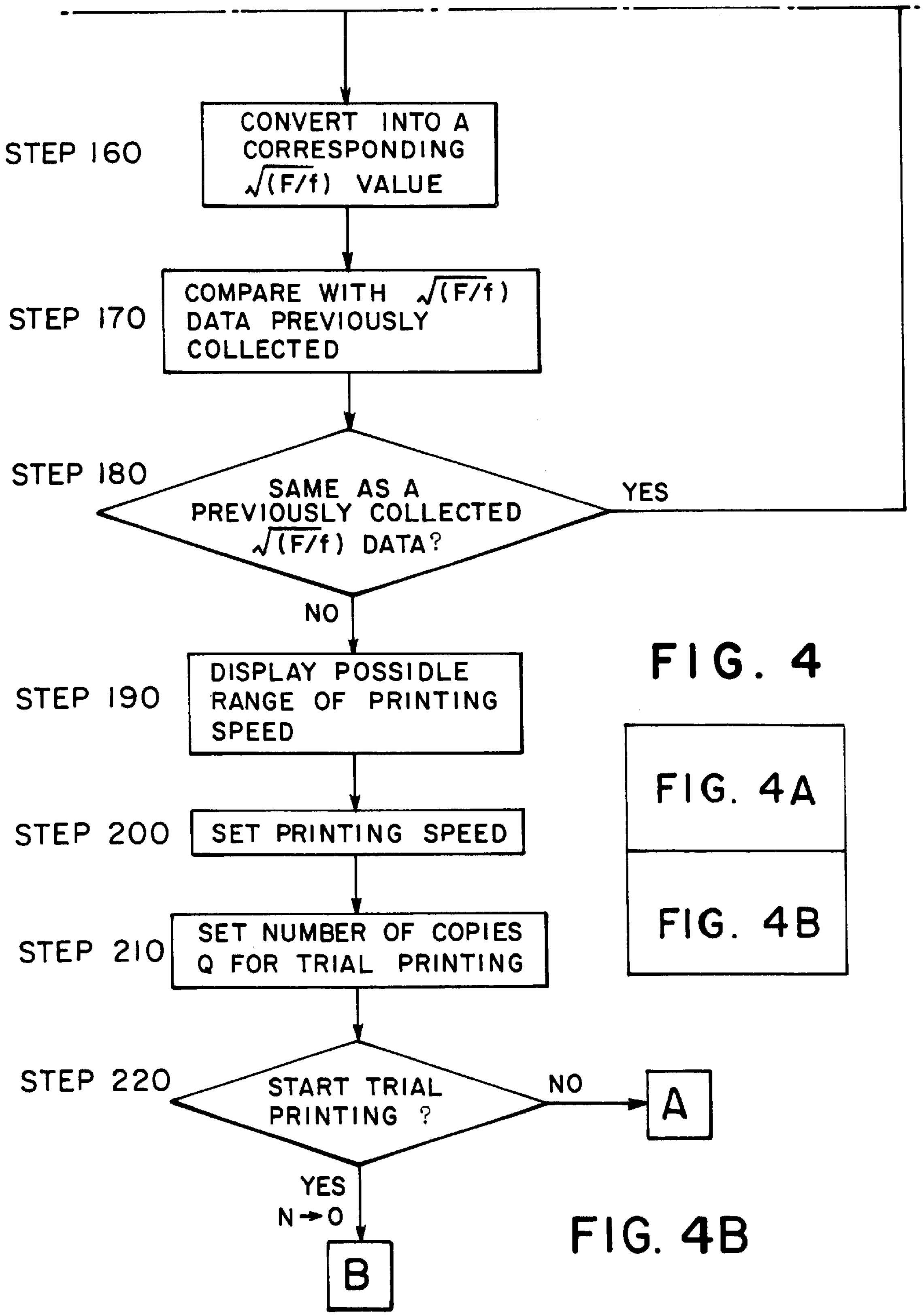

FIG. 3 shows the control unit which totally controls the operation of the stencil printing device inclusive of the operation control of the electric motor 1302 for the adjustment of the pressing force, in which the only parts of the stencil printing device that are related to the present invention are illustrated for the simplification of description.

The control unit of FIG. 3 comprises a CPU 1201 consisting of a micro processor or something like that, a ROM 1202 storing programs for controlling the operation of various units in the stencil printing device, and a RAM 1203 storing, as required, results of arithmetic operations carried out by the micro processor and various input information.

The stencil printing device comprises an operation panel 1100 equipped with a ten key 1101 for setting the desired number of copies, a printing speed set up key 1102, a printing density set up key 1103, a predicting mode set up key 1104, a printing start key 1105, and a display 1106, where the CPU 1201 receives, for instance, information on the desired number of copies set up on the ten key 1101; information on printing speed set up by the printing speed set up key 1102, that is, information on rotation speed of the printing drum; information on a relative printing density set by the printing density set up key 1103, that is, information on a value of F(F/f); information on the starting of predicting mode set by the predicting mode set up key 1104; and information commanding a start of printing set by the printing start key 1105. Based on the input information on the printing speed, the CPU 1201 controls the drive motor 1312 for the printing drum via the motor drive circuit 1311 for driving the printing drum, and receives information on an actual rotation speed of the printing drum fed back from a rotation speed sensor 1321, for example, a rotary encoder.

The CPU 1201 receives the information on the printing density of the prints printed by the printing device itself, which is measured by the printing density sensor 1331 provided to, for example, the original reading unit 11 or the paper ejecting unit 45, etc. The CPU 1201 collects a set of information consisting of a set value of √(F/f), a printing density of a print, and positional information on a position at which the printing density was measured on the print; obtains an equation which relates √(F/f) to the printing density by a statistical processing method based on the plurality of the information sets; and predicts a printing density at a value of √(F/f) desired by a user, or a printing condition at a printing density desired by a user. The CPU 1201 also determines a pressing force in performing printing based on the set value of √(F/f) and the set rotation speed of the printing drum, either by calculation or with reference to a table in which previously-calculated results are stored. The CPU 1201 also determines an operation quantity of the motor 1302 for adjustment to a targeted pressing force, and outputs the operation quantity to the motor drive circuit 1301. Furthermore, when rotation speed of the printing drum is accelerated or decelerated during printing, the motor 1302 for the adjustment of the pressing force is controlled to increase or decrease the pressing force to maintain the previously set value of √(F/f) to be substantially constant.

A control flow for predicting operation of printing density and calculation operation of proper printing conditions for the stencil printing device according to the present invention is shown in FIG. 4, FIG. 5, FIG. 6, and FIG. 7. The program of the control flow may be recorded in a recording medium other than the aforementioned ROM 1202.

Referring to the control flow, plate-making is carried out at first (step 100). Thereafter, information on the densities of prints and their printing conditions stored previously is deleted from RAM 1203, and the counter L that indicates the number of the stored information is reset to indicate 0 (step 110). Then, the value of L is judged as to whether it is less than 2 or not (step 120), and if L is less than 2, the user is prompted that information necessary for prediction is missing (step 130). Then, the user decides whether he collects pieces of information sufficient for prediction so as to continue the predicting mode, or terminate the predicting mode (step 140).

Then, a desired printing density is set by the printing density set up key 1103 (step 150). The printing density may be set by direct input of a value of √(F/f) by the ten key 1101, or may be selected by keys or a volume dial from several "dense" to "pale" levels so that the user can easily set the value.

As an example of the case not using the direct input of the value of √(F/f), a method of indirectly setting the value of √(F/f) by entering or selecting a numeral from a range of 1 to 20 using keys or a volume dial is described below. In a printer capable of variably controlling the pressing force in a range of from 10 to 20 kgf and the rotation speed of the printing drum in a range of from 30 to 120 rpm, the value of √(F/f) is variable and controllable in a range of from 0.289 to 0.816. More specifically, the printing density is variable and controllable in a range the minimum printing density of which is a printing density obtained in a printing condition that yields 0.289 as a value of √(F/f), and the maximum printing density of which is a printing density obtained in a printing condition that yields 0.816 as a value of √(F/f). In the printer above, the printing density may be represented by a density index n which is a value or integer between 1 and 20 corresponding to a value of √(F/f) according to the following equation:

$$\sqrt{(F/f)}=\{(0.816-0.289)/(20-1)\}\times(n-1)+0.289$$

where, n is a value of 1 or greater but not greater than 20.

In accordance with this method, a condition for the least dense printing can be set by entering numeral 1 as a density index on the operation panel 1100, which is then calculated into 0.289 as the value of √(F/f). When a denser printing is preferred, a larger numeral n is input. If the maximum printing density is needed, a value of 20 as a density index is entered.

In this specific example, the possible range for setting the printing density corresponds to the entire range of controllable value of √(F/f), but it may be limited to a range that is most frequently used. Furthermore, the increment of √(F/f) per density index may be constant, or may be partially narrowed or broadened. In addition, in case the range of √(F/f) value that is frequently used varies depending on environmental temperature, non-use duration, or types of inks, a sensor may be provided to detect such variations in these factors, so that the function that converts the density index into the value of √(F/f) or a coefficient thereof can be modified according to the variations to make it easier for the user to set a printing density.

As described above, a density index is input by operating the printing density set up key 1103 on the operation panel 1100. Let the density index input here be $n_c$ (step 150). The CPU 1201 converts the density index $n_c$ into a value of $\sqrt{(F/f)}$ by calculation according to the following equation or with reference to a table in which previously calculated results are stored. Let the value of $\sqrt{(F/f)}$ calculated in accordance with the equation be C (step 160):

$$C=\{(0.816-0.289)/(20-1)\}\times(n_c-1)+0.289$$

If the value of L is equivalent to 1 or larger, at least one set of information relating to a condition of trial printing and a result thereof is already stored in RAM 1203. Thus, CPU 1201 confirms whether a trial printing has already been done under the same condition as one which gives the value of $\sqrt{(F/f)}$ obtained by conversion in step 160 (step 170). If a trial printing is already performed under the same condition (step 180), this is displayed on the display 1106 (step 410), and the user is asked to set a different printing condition (step 150). In case no trial printing has been done under the same condition (step 180), the CPU 1201 reads out, from the ROM 1202, the maximum and minimum values $F_{max}$ and $F_{min}$ of the pressing force controllable by the printer, as well as the maximum and minimum values $f_{max}$ and $f_{min}$ of the rotation speed of the printing drum controllable by the printer. Then, values of $f_a$ and $f_b$ are determined by calculation in accordance with the equation below, or with reference to a table in which previously calculated results are stored.

$$f_a=F_{min}/C^2$$

$$f_b=F_{max}/C^2$$

As a result of calculation, if $f_a$ is not greater than $f_{min}$, $f_{min}$ is set as the minimum value of the controllable rotation speed of the printing drum, and if $f_{min}$ is not greater than $f_a$, $f_a$ is set as the minimum value. Similarly, if $f_{max}$ is not greater than $f_b$, $f_{max}$ is set as the maximum value, and if $f_b$ is not larger than $f_{max}$, $f_b$ is set as the maximum value of the controllable rotation speed of the printing drum. Then, the maximum value and the minimum value thus determined are displayed on the operation panel 1100 (step 190).

Then, the user inputs information on rotation speed of the printing drum by selecting a value from the range of the rotation speed displayed on the panel using the printing speed set up key 1102, and the CPU 1201 stores the input value in the RAM 1203. Let the rotation speed of the printing drum set in this step be $f_c$ (step 200).

The number of copies Q to be produced in trial printing is set by use of the ten key 1101 on the operation panel 1100, and the copy number information is stored in the RAM 1203 (step 210). It is then monitored if the printing start key provided on the operation panel 1100 is keyed in or not; that is, it is monitored whether printing is to be started or not (step 220).

If printing is to be started, the printing drum starts to be driven to the set rotation speed. Whether rotation of the printing drum is accelerated to the set rotation speed from stopped state or from rotated state during printing, an abrupt change in speed is unfavorable, and a moderate change in printing speed is preferred. On the other hand, since printing density depends on rotation speed of the printing drum, printing density should be adjusted by the pressing force if the printing speed is changed. The present embodiment employs, as described below, a method in which a compensation amount of pressing force is properly determined in response to variation in monitored rotation speed of the printing drum. However, the method for compensation may be such that determines a rotation speed of the printing drum in response to variation in the pressing force being monitored.

Figure 5:
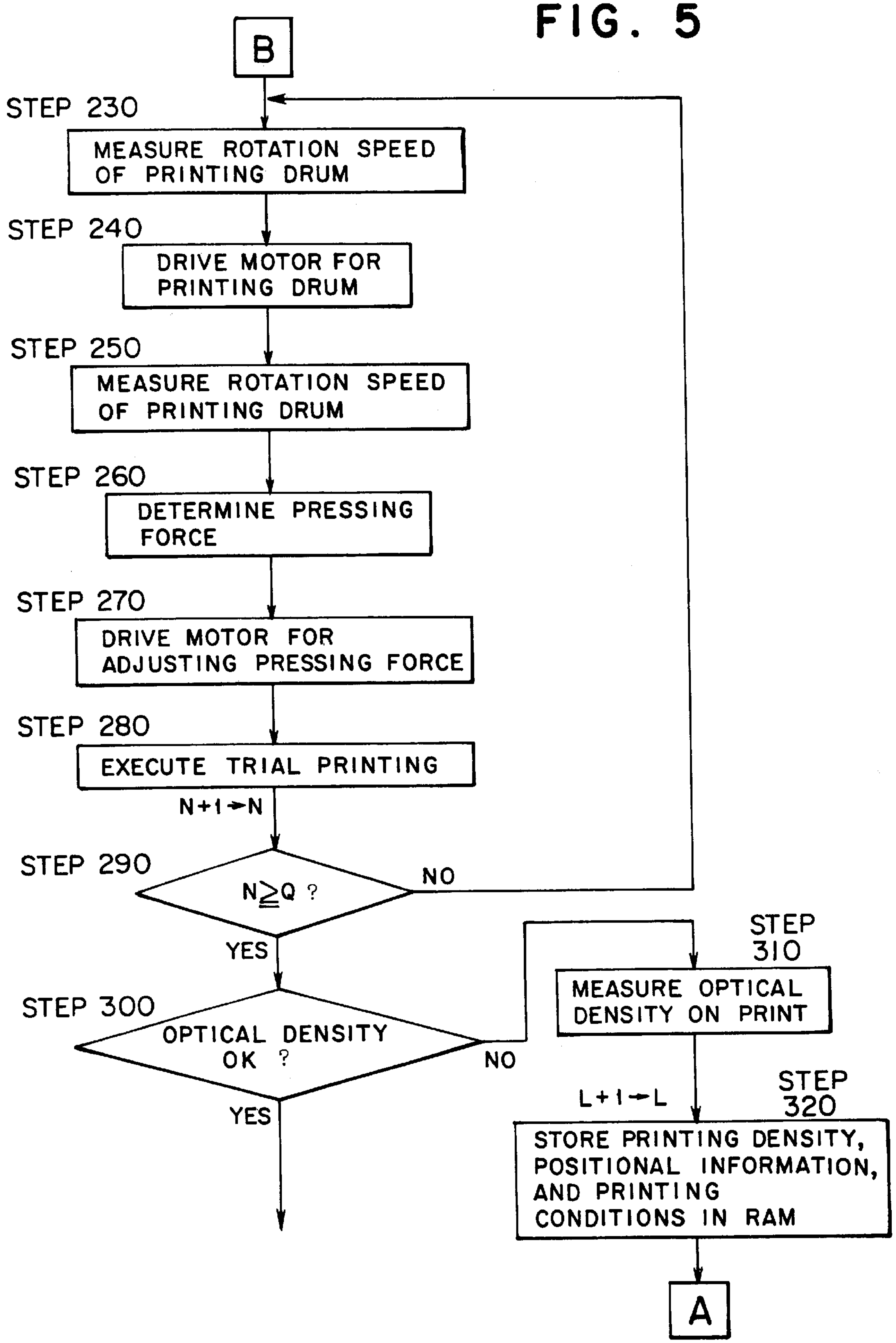
FIG. 5 is a flow chart showing a control operation in trial printing in accordance with FIG. 4.

Referring to FIG. 5, first of all, the CPU 1201 collects information on rotation speed of the printing drum from a rotation speed sensor 1321 such as a rotary encoder fitted to the printing drum or a motor for driving the printing drum (step 230).

Let the observed rotation speed of the printing drum be ft, and a desired rotation speed of the printing drum stored in the RAM 1203 be $f_e$. The CPU 1201 compares $f_{t1}$ with $f_e$, and if the difference between them is 30 rpm or more, a control signal is output to the motor drive circuit 1311 for accelerating or decelerating the printing drum by 30 rpm. When the difference is less than 30 rpm, a control signal is output to the motor drive circuit 1311 for driving the printing drum to match $f_{t1}$ with $f_e$ (step 240).

After the speed has been changed in accordance with the control signal, the CPU 1201 reads rotation speed information of the printing drum again (step 250). Let the observed rotation speed of the printing drum be $f_{t2}$ and the value of the density information $\sqrt{(F/f)}$ set in the RAM 1203 be E. Then, the CPU 1201 determines a proper pressing force by calculation according to the equation below or with reference to a table in which previously calculated results are stored (step 260).

$$F_{t2}=f_{t2}\times E^2$$

Then, the CPU 1201 outputs an operation signal to the motor drive circuit 1301 for controlling the pressing force in such a manner that the calculated proper pressing force should be realized. The motor 1302 for adjustment of pressing force is driven in accordance with the thus output signal, and the nut member 99 is rotated so that the pressing force is set at a proper value while the tensioning of the tensile coil spring 101 is optimized (step 270).

The value of counter N is incremented every time printing is executed on a sheet of printing paper, and the counter value is rewritten (step 280). The number of copies Q to be produced by trial printing is compared with the counter value N, and if N is smaller than Q, printing process is executed again while controlling the value of $\sqrt{(F/f)}$, until the printing is stopped when N becomes a value equivalent to or larger than Q (step 290).

After finishing the trial printing, it is confirmed that a satisfactory density is obtained on the print (step 300). The confirmation can be done either subjectively or objectively, i.e., by visual judgement or by measuring the optical density. In case of superposing inks by additional printing, in particular, it is difficult to evaluate whether the printing is done successfully or not until all of the colors are superposed. In such a case, the optical density must be measured for each of the superposed colors to judge whether a desired print is obtained or not.

If the printed result is satisfactory, the printing is executed to obtain the desired number of copies under a condition maintaining the value of $\sqrt{(F/f)}$, i.e., the condition of trial printing.

If the printed result is unsatisfactory, on the other hand, the print obtained in trial printing is set on the original reading unit 11 to acquire the information on a density of the print and a position where the density is measured on the print, (step 310). Otherwise, a printing density sensor 1331 may be provided at the paper ejecting portion to automatically acquire the density and positional information on the print during printing.

Then, the counter L which provides the number of density information is incremented by 1 and stored; thus, the information on the measured density of the print and the position thereof, the value of $\sqrt{(F/f)}$ corresponding to the printing condition, and the value of the counter provided as an identification number to distinguish a set of information from others, are stored in the RAM 1203 as a set of information (step 320).

In step 120 (FIG. 4), if the counter L indicates a value of 2 or more, a predicting mode can be selected by keying a predicting mode set up key 1104 provided on the operation panel 1100 (step 400). If the user desires to know a value of the printing density under a printing condition $\sqrt{(F/f)}$ set by the printing density set up key 1103 and/or the printing speed set up key 1102 in advance, density predicting mode can be selected. Otherwise, if the user desires to execute printing by at a specific value of printing density, a condition calculating mode can be selected. If the user does not desire to use the predicting mode, the selection is ended by simply hitting a return key.

Figure 6A:
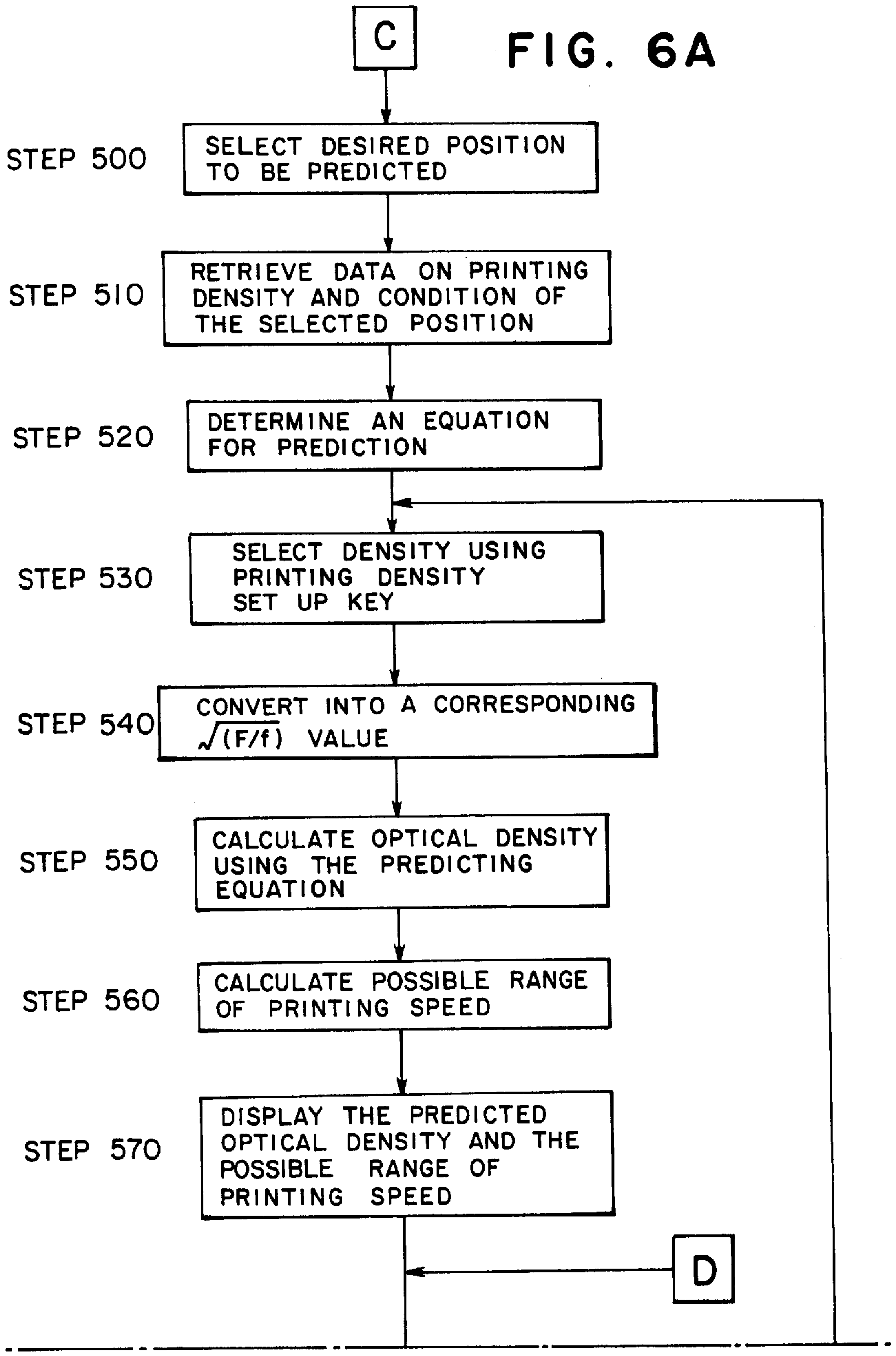
FIG. 6 is a flow chart showing a control operation in density predicting mode in accordance with FIG. 4.
Figures 6, 6A, 6B:
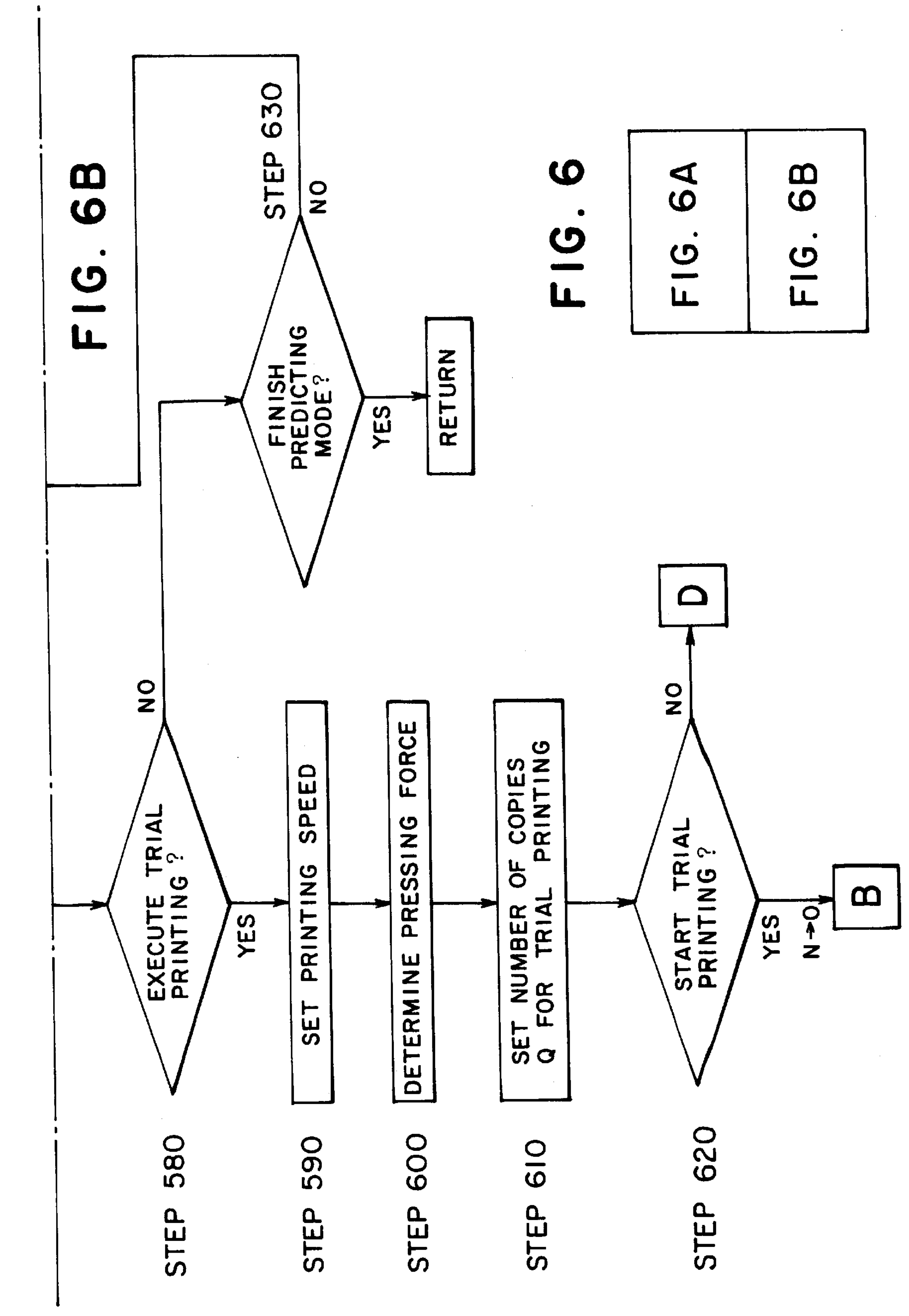

If the density predicting mode is selected, as shown in FIG. 6, the information on positions at which printing density has been measured and stored is displayed on the display 1106, and the user selects a position at which he desires to predict a printing density (step 500).

The number of information sets each consisting of a printing density at the selected position and its printing condition, i.e., a value of $\sqrt{(F/f)}$ stored in the RAM 1201, is L. Then, the information sets are retrieved from the RAM 1201 (step 510). Then, an equation for predicting a printing density is determined from the thus retrieved information sets in accordance with the following equations (step 520):

$$V = \frac{L \times \sum_{i=1}^{L}\left(\sqrt{\frac{F_i}{f_i}} \times OD_i\right) - \left(\sum_{i=1}^{L}\sqrt{\frac{F_i}{f_i}}\right) \times \left(\sum_{i=1}^{L} OD_i\right)}{L \times \left(\sum_{i=1}^{L}\frac{F_i}{f_i}\right) - \left(\sum_{i=1}^{L}\sqrt{\frac{F_i}{f_i}}\right)^2}$$

$$W = \frac{\left(\sum_{i=1}^{L} OD_i\right) - V \times \left(\sum_{i=1}^{L}\sqrt{\frac{F_i}{f_i}}\right)}{L} 0.9 \times \left(V \times \sqrt{\frac{F}{f}} + W\right) \leq$$

$$OD \leq 1.1 \times \left(V \times \sqrt{\frac{F}{f}} + W\right)$$

Thereafter, a printing condition, under which an optical density is predicted, is set. A pressing force F at which a printing sheet is pressed to the drum and a rotation speed f of the drum may be set by keying directly; however, as described above, the user may indirectly set the value of $\sqrt{(F/f)}$ by using the density index n with operation of the printing density set up key 1103 (step 530). The CPU 1201 then converts the thus set density index into a value of $\sqrt{(F/f)}$ (step 540). Let the value of $\sqrt{(F/f)}$ after conversion be G. The CPU 1201 predicts a printing density by substituting G for the value of $\sqrt{(F/f)}$ in the above prediction equation (step 550).

The CPU 1201 then reads out, from the ROM 1202, the maximum and minimum values $F_{max}$ and $F_{min}$ of the pressing force controllable by the printer, as well as the maximum and minimum values $f_{max}$ and $f_{min}$ of the rotation speed of the printing drum controllable by the printer. Then, values of $f_a$ and $f_b$ are determined by calculation in accordance with the equation below, or with reference to a table in which previously calculated results are stored.

$$f_a = F_{min}/G^2$$

$$f_b = F_{max}/G^2$$

As a result of calculation, if $f_a$ is not greater than $f_{min}$, $f_{min}$ is set as the minimum value of the controllable rotation speed of the printing drum, and if $f_{min}$ is not greater than $f_a$, $f_a$ is set as the minimum value. Similarly, if $f_{max}$ is not greater than $f_b$, $f_{max}$ is set as the maximum value, and if $f_b$ is not larger than $f_{max}$, $f_b$ is set as the maximum value of the controllable rotation speed of the printing drum (step 560). Then, the range of the selectable rotation speed for the drum and the predicted density, which is the range of $OD_g$ shown by the following formula, is displayed on the display 1106 (step 570).

$$0.9 \times (V \times G + W) OD_g 1.1 \times (V \times G + W)$$

The user then judges whether the predicted printing density matches with the desired one (step 580), and, if necessary, the printing conditions are set again (step 630). If the deviation from the desired range is too large to correct by simply changing the printing condition, plate-making is newly carried out. If the predicted printing density matches with the desired one, trial printing is executed for confirmation. A rotation speed of the drum is selected from the displayed selectable range of rotation speed by keying the printing speed set up key 1102, and the information is input and stored in the RAM 1203 by the CPU 1201. Let the printing speed thus set be $f_g$ (step 590).

The CPU 1201 determines a proper pressing force $f_g$ by calculation in accordance with the equation below, or with reference to a table in which previously calculated results are stored (step 600).

$$F_g = f_g \times G^2$$

Then, the number of copies Q to be produced by trial printing is set by use of the ten key 1101 on the operation panel 1100, and the copy number information is stored in the RAM 1203 (step 610). It is then monitored if the print start key provided on the operation panel 1100 is keyed in or not; that is, it is monitored whether printing is to be started or not (step 620).

Figure 7A:
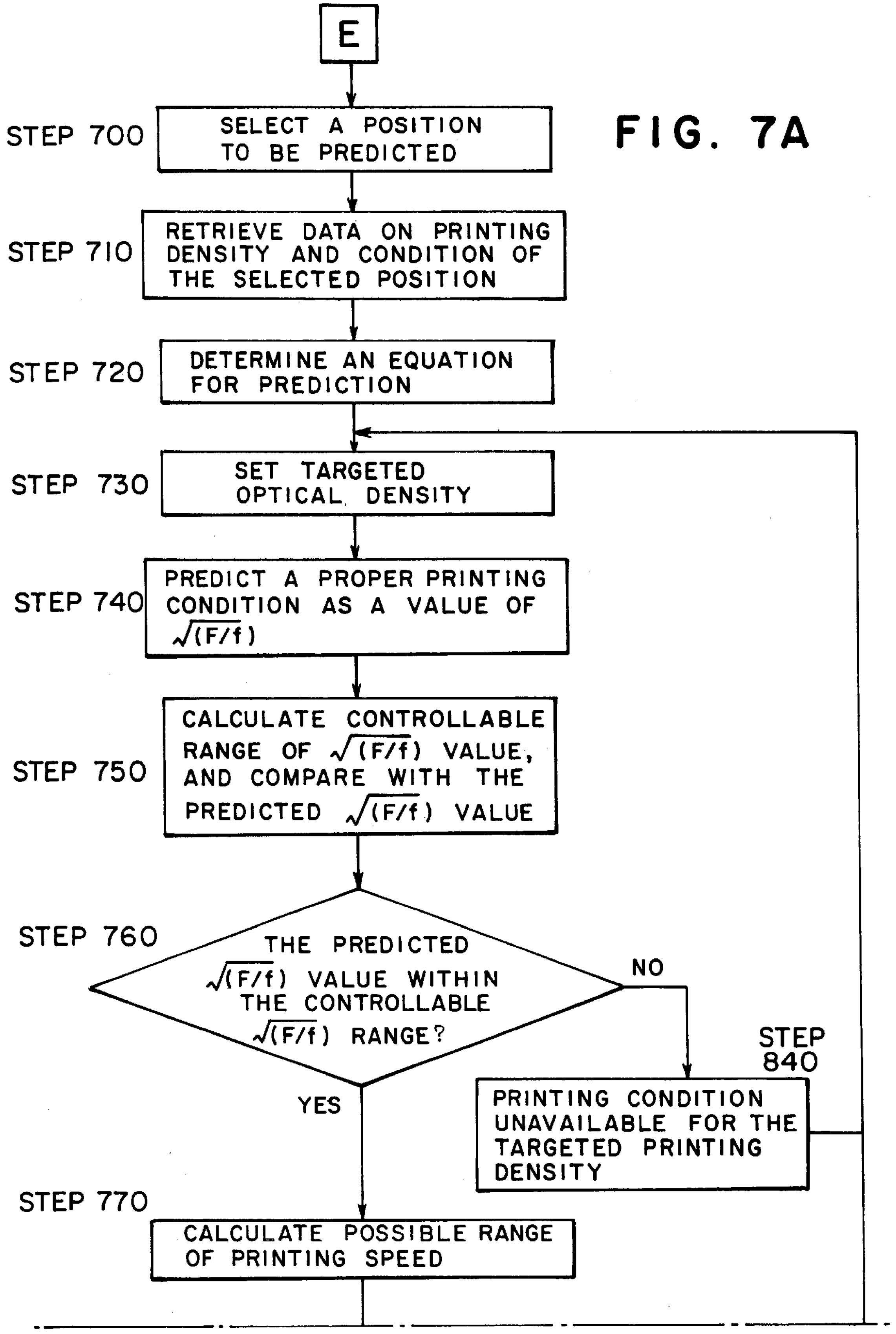
FIG. 7 is a flow chart showing a control operation in condition calculating mode in accordance with FIG. 4.
Figures 7, 7A, 7B:
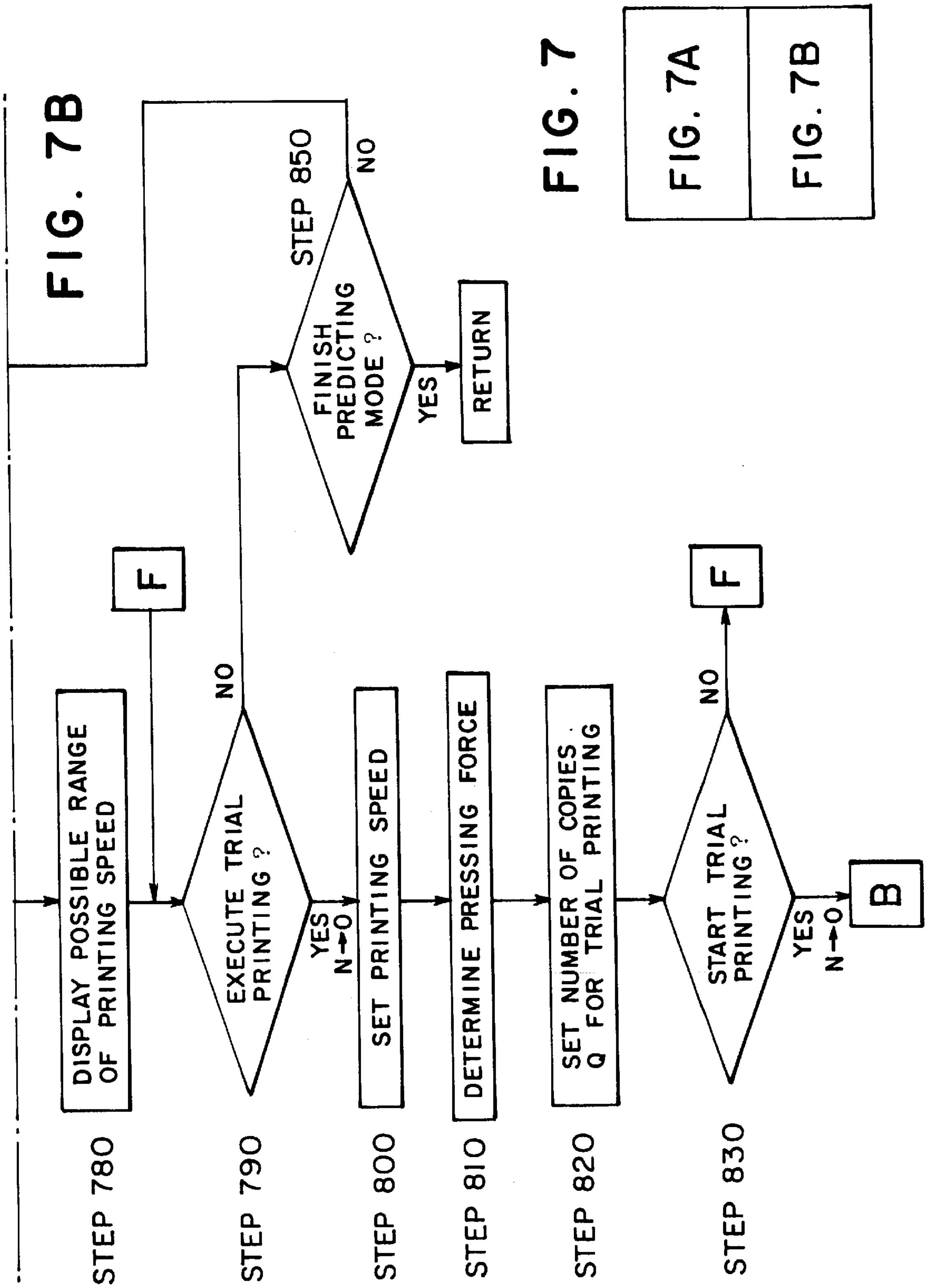

The printing condition calculating mode is, as shown in FIG. 7, a method for predicting a proper printing condition under which a printed image of a desired optical density is obtained. For instance, in case of superposing inks of different colors to obtain an image with a desired color hue and lightness, printing must be executed in each color at a specific optical density.

In case a printing condition calculating mode is selected, the CPU 1201 displays, on the display 1106, the information on positions at which optical densities of prints have been measured and stored. The user selects a desired position at which an optical density is to be set (step 700). The number of information sets each consisting of a printing density OD and its printing condition, i.e., the value of $\sqrt{(F/f)}$ stored in the RAM 1201, is L. Then, the information sets are retrieved from the RAM 1201 (step 710). A predicting equation is then determined in accordance with the following equations (step 720):

$$V=\frac{L\times\sum_{i=1}^{L}\left(\sqrt{\frac{F_i}{f_i}}\times OD_i\right)-\left(\sum_{i=1}^{L}\sqrt{\frac{F_i}{f_i}}\right)\times\left(\sum_{i=1}^{L}OD_i\right)}{L\times\left(\sum_{i=1}^{L}\frac{F_i}{f_i}\right)-\left(\sum_{i=1}^{L}\sqrt{\frac{F_i}{f_i}}\right)^2}$$

$$W=\frac{\left(\sum_{i=1}^{L}OD_i\right)-V\times\left(\sum_{i=1}^{L}\sqrt{\frac{F_i}{f_i}}\right)}{L}$$

$$\sqrt{\frac{F}{f}}=\frac{OD-W}{V}$$

The targeted printing density is then set (step 730). Let the printing density thus set be $OD_h$. The CPU 1201 substitutes the value of $OD_h$ into the prediction equation, and obtains a combination of the pressing force which presses the paper against the drum and the rotation speed of the drum, as a value of √(F/f), in accordance with the following equation. Let the value obtained here be H (step 740).

$$H=(OD_h-W)/V$$

The CPU 1201 then reads out, from the ROM 1202, the maximum and minimum values $f_{max}$ and $f_{min}$ of the rotation speed of the printing drum controllable by the printer, as well as the maximum and minimum values $F_{max}$ and $F_{min}$ of the pressing force controllable by the printer. Then, the range of value √(F/f) controllable by the printer is calculated in accordance with the following formula (step 750). Furthermore, it compares whether the value of √(F/f) predicted above as a proper printing condition is included in the controllable range or not (step 760).

$$\sqrt{(F_{min}/f_{max})}\leqq H\sqrt{\ }(F_{max}/f_{min})$$

If the value of H does not fall within the controllable range above, the user is prompted that the printing condition necessary to obtain the targeted optical density cannot be set (step 840). If H is within the controllable range, the CPU 1201 reads out, from the ROM 1202, the maximum and minimum values $F_{max}$ and $F_{min}$ of the pressing force controllable by the printer, as well as the maximum and minimum values $f_{max}$ and $f_{min}$ of the rotation speed of the printing drum controllable by the printer. Then, values of $f_a$ and $f_b$ are determined by calculation in accordance with the equation below, or with reference to a table in which previously calculated results are stored.

$$f_a=F_{min}/H^2$$

$$f_b=F_{max}/H^2$$

As a result of calculation, if $f_a$ is not greater than $f_{min}$, $f_{min}$ is set as the minimum value of the controllable rotation speed of the printing drum, and if $f_{min}$ is not greater than $f_a$, $f_a$ is set as the minimum value. Similarly, if $f_{max}$ is not greater than $f_b$, $f_{max}$ is set as the maximum value, and if $f_b$ is not larger than $f_{max}$, $f_b$ is set as the maximum value of the controllable rotation speed of the printing drum. Thus, these values are displayed on the operation panel 1100 (step 780).

The user then judges whether the predicted printing speed falls within the desired range or not (step 790), and if necessary, reconsiders the targeted printing density or conduct a new plate-making (step 850). If the predicted printing condition matches with a desired one, trial printing is executed for confirmation. A printing speed fh is set (step 800), and the CPU 1201 determines a proper pressing force Fh by calculation in accordance with the equation below, or with reference to a table in which previously calculated results are stored (step 810).

$$Fh=fh\times H^2$$

Then, the number of copies Q to be produced in trial printing is set by use of the ten key 1101 on the operation panel 1100, and the CPU 1201 stores the copy number information in the RAM 1203 (step 820). It is then monitored if the print start key provided on the operation panel 1100 is keyed in or not; that is, it is monitored whether printing is to be started or not (step 830).

In the present embodiment, printing density was approximated by a first order equation of √(F/f). However, other functions such as a polynomial and the like, may be used for the approximation. More specifically, the formula of Murray and Davis or of Yule and Nielsen concerning the reflection density of dot prints can be used as well.

Furthermore, in the embodiment above, the pressing force is determined after the printing speed is set, when a combination of a printing speed and a pressing force that realizes a desired √(F/f) value is determined. However, a pressing force may be determined prior to the setting of a printing speed.

EXAMPLE 1

Printing was performed using the above stencil printing device under printing conditions of two different levels of √(F/f). The values of V and W were determined by means of least-squares method from the observed reflection density values OD to derive the equation of OD=V×(F/f)+W, and then, a printing density under a printing condition of a third level of √(F/f) was predicted from the thus-obtained equation. Printing was executed under the printing condition of the third level, and the observed reflection density was compared with the predicted value. Then, the observed reflection density was added as an additional data to the ones previously obtained under the two different levels to make a prediction of a printing density under a printing condition of the fourth level. Then, the predicted reflection density was compared with a reflection density observed in actual printing under the printing condition of the fourth level. The observed reflection density obtained under the printing condition of the fourth level was added as an additional data to the previous three data obtained under different three levels, and prediction was made accordingly on the printing density to be obtained under a printing condition of a fifth level value of √(F/f). The predicted value was compared with a reflection density observed in actual printing under the printing condition of the fifth level.

In the experiment, commercially available stencil sheets (Model GR76W, manufactured by Riso Kagaku Corporation) were processed in such a manner to obtain masters for stencil printing having five plate regions differing in perforation rate. Under a microscope, the five plate regions were each found to be perforated at rates of 11%, 20%, 41%, 59%, 78%, and 100%. The term "perforation rate" herein means a percentage of the perforated holes in a master plate for stencil printing with respect to the maximum resolution of a plate-making device; for instance, the perforation rate is 100% if 400 holes are perforated per 1 inch by using a plate making device having a resolution of 400 dpi, and is 50% if 200 holes are perforated by using the same plate making device.

A commercially available stencil printing ink (GR ink, black, manufactured by Riso Kagaku Corporation) was used as a printing ink, and wood-free paper (Riso A3-size printing paper manufactured by Riso Kagaku Corporation) was used as printing paper.

Rotation speed of the printing drum was measured in unit of rpm by using a rotary encoder. Pressing force of the press roller was measured in unit of kg·f by a load cell which was pressed by the entire press roller while the press roller is under pressing operation by the drive unit. Printing density of printed image was measured using a reflection densitometer (Model RD 920 manufactured by Macbeth Corp.), five times, and an average value thereof was used for evaluation. The results of evaluation are shown in Tables 1 to 6.

TABLE 1

(Perforation rate = 11%)

| No. of level | 1 | 2 | 3 |
|---|---|---|---|
| Rotation speed of printing drum f (rpm) | 30 | 60 | 80 |
| Pressing force F (kg · f) | 14.5 | 14.5 | 12.7 |
| Value of √ (F/f) | 0.70 | 0.49 | 0.40 |
| Predicted Reflection density (maximum value) | — | — | 0.213 |
| Predicted Reflection density (median) | — | — | 0.194 |
| Predicted Reflection density (minimum value) | — | — | 0.175 |
| Observed Reflection density OD | 0.254 | 0.212 | 0.192 |
| Prediction Equation V = | — | 0.200 | 0.205 |
| Prediction Equation W = | — | 0.114 | 0.110 |

TABLE 2

(Perforation rate = 59%)

| No. of level | 1 | 2 | 3 |
|---|---|---|---|
| Rotation speed of printing drum f (rpm) | 120 | 60 | 30 |
| Pressing force F (kg · f) | 10.8 | 14.5 | 14.5 |
| Value of √ (F/f) | 0.30 | 0.49 | 0.70 |
| Predicted Reflection density (maximum value) | — | — | 1.10 |
| Predicted Reflection density (median) | — | — | 1.00 |
| Predicted Reflection density (minimum value) | — | — | 0.902 |
| Observed Reflection density OD | 0.648 | 0.816 | 0.972 |
| Prediction Equation V = | — | 0.884 | 0.809 |
| Prediction Equation W = | — | 0.383 | 0.410 |

TABLE 3

(Perforation rate = 20%)

| No. of level | 1 | 2 | 3 | 4 |
|---|---|---|---|---|
| Rotation speed of printing drum f (rpm) | 45 | 60 | 120 | 30 |
| Pressing force F (kg · f) | 16.4 | 14.5 | 10.8 | 19.8 |
| Value of √ (F/f) | 0.60 | 0.49 | 0.30 | 0.81 |
| Predicted Reflection density (maximum value) | — | — | 0.281 | 0.489 |
| Predicted Reflection density (median) | — | — | 0.255 | 0.444 |

TABLE 3-continued (Perforation rate = 20%)

| No. of level | 1 | 2 | 3 | 4 |
|---|---|---|---|---|
| Predicted Reflection density (minimum value) | — | — | 0.230 | 0.400 |
| Observed Reflection density OD | 0.370 | 0.328 | 0.262 | 0.448 |
| Prediction Equation V = | — | 0.382 | 0.359 | 0.366 |
| Prediction Equation W = | — | 0.141 | 0.154 | 0.151 |

TABLE 4

(Perforation rate = 41%)

| No. of level | 1 | 2 | 3 | 4 |
|---|---|---|---|---|
| Rotation speed of printing drum f (rpm) | 60 | 45 | 120 | 80 |
| Pressing force F (kg · f) | 14.5 | 16.4 | 10.8 | 12.7 |
| Value of √ (F/f) | 0.49 | 0.60 | 0.30 | 0.40 |
| Predicted Reflection density (maximum value) | — | — | 0.480 | 0.591 |
| Predicted Reflection density (median) | — | — | 0.437 | 0.537 |
| Predicted Reflection density (minimum value) | — | — | 0.393 | 0.483 |
| Observed Reflection density OD | 0.592 | 0.682 | 0.470 | 0.538 |
| Prediction Equation V = | — | 0.818 | 0.700 | 0.699 |
| Prediction Equation W = | — | 0.191 | 0.257 | 0.258 |

TABLE 5

(Perforation rate = 78%)

| No. of level | 1 | 2 | 3 | 4 |
|---|---|---|---|---|
| Rotation speed of printing drum f (rpm) | 45 | 30 | 120 | 80 |
| Pressing force F (kg · f) | 16.4 | 14.5 | 10.8 | 12.7 |
| Value of √ (F/f) | 0.60 | 0.70 | 0.30 | 0.40 |
| Predicted Reflection density (maximum value) | — | — | 0.891 | 0.956 |
| Predicted Reflection density (median) | — | — | 0.810 | 0.869 |
| Predicted Reflection density (minimum value) | — | — | 0.729 | 0.782 |
| Observed Reflection density OD | 1.02 | 1.09 | 0.794 | 0.862 |
| Prediction Equation V = | — | 0.700 | 0.743 | 0.750 |
| Prediction Equation W = | — | 0.600 | 0.572 | 0.567 |

TABLE 6

(Perforation rate = 100%)

| No. of level | 1 | 2 | 3 | 4 | 5 |
|---|---|---|---|---|---|
| Rotation speed of printing drum f (rpm) | 120 | 80 | 60 | 45 | 30 |
| Pressing force F (kg · f) | 10.8 | 12.7 | 14.5 | 16.4 | 14.5 |
| Value of √ (F/f) | 0.30 | 0.40 | 0.49 | 0.60 | 0.70 |
| Predicted Reflection density (maximum value) | — | — | 1.09 | 1.15 | 1.22 |
| Predicted Reflection density (median) | — | — | 0.993 | 1.05 | 1.11 |
| Predicted Reflection density (minimum value) | — | — | 0.894 | 0.941 | 1.00 |

TABLE 6-continued (Perforation rate = 100%)

| No. of level | 1 | 2 | 3 | 4 | 5 |
|---|---|---|---|---|---|
| Observed Reflection density OD | 0.856 | 0.928 | 0.974 | 1.05 | 1.11 |
| Prediction Equation V = | — | 0.720 | 0.623 | 0.635 | 0.630 |
| Prediction Equation W = | — | 0.640 | 0.672 | 0.668 | 0.670 |

From the results shown in Tables 1 to 6, it is confirmed that the printing density can be predicted under desired printing conditions on the basis of printing density values that have been obtained under printing conditions of two or more different levels of √(F/f). It is also found that the observed reflection densities fall within a range of +10% of the predicted reflection density.

EXAMPLE 2

Printing was performed using the same stencil printing device as in EXAMPLE 1, under printing conditions with different levels of √(F/f). From the observed data, V and W were determined by means of least-squares method to derive the equation of √(F/f)=(OD−W)/V, and a printing condition capable of providing prints of a targeted printing density was predicted from the thus obtained equation. Printing was executed under the predicted printing condition, and then a printing density on the print was measured and compared with the targeted printing density. The results are given in Tables 7 to 9 below.

TABLE 7

(Perforation rate = 20%)

| No. of level | 1 | 2 | Predicted printing condition with a target reflection density of 0.30 |
|---|---|---|---|
| Rotation speed of printing drum f (rpm) | 45 | 60 | 80 |
| Pressing force F (kg · f) | 16.4 | 14.5 | 12.7 |
| Value of √ (F/f) | 0.60 | 0.49 | 0.4 (predicted value) |
| Observed Reflection density | 0.370 | 0.328 | 0.294 |

TABLE 8

(Perforation rate = 41%)

| No. of level | 1 | 2 | Predicted printing condition with a target reflection density of 0.83 |
|---|---|---|---|
| Rotation speed of printing drum f (rpm) | 60 | 45 | 30 |
| Pressing force F (kg · f) | 14.5 | 16.4 | 19.8 |
| Value of √ (F/f) | 0.49 | 0.60 | 0.81 (predicted value) |
| Observed Reflection density | 0.592 | 0.682 | 0.816 |

TABLE 9

(Perforation rate = 78%)

| No. of level | 1 | 2 | Predicted printing condition with a target reflection density of 0.930 |
|---|---|---|---|
| Rotation speed of printing drum f (rpm) | 45 | 80 | 60 |
| Pressing force F (kg · f) | 16.4 | 12.7 | 14.5 |
| Value of √ (F/f) | 0.60 | 0.40 | 0.49 (predicted value) |
| Observed Reflection density | 1.02 | 0.862 | 0.944 |

From the results shown in Tables 7 to 9, it is confirmed that a printing condition suitable for obtaining a print of a targeted printing density can be predicted on the basis of the printing density values that have been obtained under printing conditions of two or more different levels of √(F/f).

As can be understood from the above description, according to the present invention, a printing density and a printing condition for stencil printing can be predicted without much trial printing. Thus, the present invention avoids waste of printing paper, and reduces printing cost and consumption of resources.

Although the present invention has been described in terms of a specific embodiment thereof, it is possible to modify and alter details thereof without departing from the spirit and scopes of the present invention.

What is claimed is:

1. In a stencil printing in which a perforated stencil sheet is wound around a circumferential surface of a printing drum to which an ink is supplied, and the ink is transferred from the printing drum to a printing sheet through the perforated stencil sheet by pressing the printing sheet and the printing drum against each other while the drum is rotated, a method for predicting a printing density comprises (a) a first step of measuring printing densities on at least two copies of print at corresponding printed portions thereof, said copies of print being obtained under different conditions of F/f, in which F is a pressing force at which the printing sheet is pressed to the drum and f is a rotation speed of the drum, (b) a second step of statistically processing said printing densities measured in the first step, in order to obtain a function of printing density and F/f value, and (c) a third step of calculating a printing density at a desired pressing force and a desired rotation speed based on the function obtained in the second step.

2. A printing density predicting method according to claim 1, in which said function obtained in the second step is indicated as follows:

$$OD=V\times\sqrt{(F/f)}+W$$

wherein OD means printing density, V and W mean constants.

3. A printing density predicting method according to claim 2, in which said V and W are calculated based on a least-squares method in accordance with the following equation:

$$V=\frac{L\times\sum_{i=1}^{L}\left(\sqrt{\frac{F_i}{f_i}}\times OD_i\right)-\left(\sum_{i=1}^{L}\sqrt{\frac{F_i}{f_i}}\right)\times\left(\sum_{i=1}^{L}OD_i\right)}{L\times\left(\sum_{i=1}^{L}\frac{F_i}{f_i}\right)-\left(\sum_{i=1}^{L}\sqrt{\frac{F_i}{f_i}}\right)^2}$$

$$W=\frac{\left(\sum_{i=1}^{L}OD_i\right)-V\times\left(\sum_{i=1}^{L}\sqrt{\frac{F_i}{f_i}}\right)}{L}.$$

4. In a stencil printing in which a perforated stencil sheet is wound around a circumferential surface of a printing drum to which an ink is supplied, and the ink is transferred from the printing drum to a printing sheet through the perforated stencil sheet by pressing the printing sheet and the printing drum against each other while the drum is rotated, a method for calculating a printing condition comprises (a) a first step of measuring printing densities on at least two copies of print at corresponding printed portions thereof, said copies of print being obtained under different conditions of F/f, in which F is a pressing force at which the printing sheet is pressed to the drum and f is a rotation speed of the drum, (b) a second step of statistically processing said printing densities measured in the first step, in order to obtain a function of printing density and F/f value, and (c) a third step of calculating a combination of a pressing force and a rotation speed at a desired printing density based on the function obtained in the second step.

5. A printing condition calculating method according to claim 4, in which said function obtained in the second step is indicated as follows:

$$OD=V\times\sqrt{(F/f)}+W$$

wherein OD means printing density, V and W mean constants.

6. A printing condition calculating method according to claim 5, in which said V and W are calculated based on a least-squares method in accordance with the following equation:

$$V=\frac{L\times\sum_{i=1}^{L}\left(\sqrt{\frac{F_i}{f_i}}\times OD_i\right)-\left(\sum_{i=1}^{L}\sqrt{\frac{F_i}{f_i}}\right)\times\left(\sum_{i=1}^{L}OD_i\right)}{L\times\left(\sum_{i=1}^{L}\frac{F_i}{f_i}\right)-\left(\sum_{i=1}^{L}\sqrt{\frac{F_i}{f_i}}\right)^2}$$

$$W=\frac{\left(\sum_{i=1}^{L}OD_i\right)-V\times\left(\sum_{i=1}^{L}\sqrt{\frac{F_i}{f_i}}\right)}{L}.$$

7. A device for predicting a printing density for use in stencil printing in which a perforated stencil sheet is wound around a circumferential surface of a printing drum to which an ink is supplied, and the ink is transferred from the printing drum to a printing sheet through the perforated stencil sheet by pressing the printing sheet and the printing drum against each other while the drum is rotated, which comprises (a) a first means for measuring printing densities on at least two copies of print at corresponding printed portions thereof, said copies of print being obtained under different conditions of F/f, in which F is a pressing force at which the printing sheet is pressed to the drum and f is a rotation speed of the drum, (b) a second means for statistically processing said printing densities measured in the first means, in order to obtain a function of printing density and F/f value, and (c) a third means for calculating a printing density at a desired pressing force and a desired rotation speed based on the function obtained in the second means.

8. A printing density predicting device according to claim 7, in which said function obtained in the second means is indicated as follows:

$$OD=V\times\sqrt{(F/f)}+W$$

wherein OD means printing density, V and W mean constants.

9. A printing density predicting device according to claim 8, in which said V and W are calculated based on a least-squares method in accordance with the following equation:

$$V=\frac{L\times\sum_{i=1}^{L}\left(\sqrt{\frac{F_i}{f_i}}\times OD_i\right)-\left(\sum_{i=1}^{L}\sqrt{\frac{F_i}{f_i}}\right)\times\left(\sum_{i=1}^{L}OD_i\right)}{L\times\left(\sum_{i=1}^{L}\frac{F_i}{f_i}\right)-\left(\sum_{i=1}^{L}\sqrt{\frac{F_i}{f_i}}\right)^2}$$

$$W=\frac{\left(\sum_{i=1}^{L}OD_i\right)-V\times\left(\sum_{i=1}^{L}\sqrt{\frac{F_i}{f_i}}\right)}{L}.$$

10. A device for calculating a printing condition for use in stencil printing in which a perforated stencil sheet is wound around a circumferential surface of a printing drum to which an ink is supplied, and the ink is transferred from the printing drum to a printing sheet through the perforated stencil sheet by pressing the printing sheet and the printing drum against each other while the drum is rotated, which comprises (a) a first means for measuring printing densities on at least two copies of print at corresponding printed portions thereof, said copies of print being obtained under different conditions of F/f, in which F is a pressing force at which the printing sheet is pressed to the drum and f is a rotation speed of the drum, (b) a second means for statistically processing said printing densities measured in the first means, in order to obtain a function of printing density and F/f value, and (c) a third means for calculating a combination of a pressing force and a rotation speed at a desired printing density based on the function obtained in the second means.

11. A printing condition calculating device according to claim 10, in which said function obtained in the second means is indicated as follows:

$$OD=V\times\sqrt{(F/f)}+W$$

wherein OD means printing density, V and W mean constants.

12. A printing condition calculating device according to claim 11, in which said V and W are calculated based on a least-squares method in accordance with the following equation:

$$V=\frac{L\times\sum_{i=1}^{L}\left(\sqrt{\frac{F_i}{f_i}}\times OD_i\right)-\left(\sum_{i=1}^{L}\sqrt{\frac{F_i}{f_i}}\right)\times\left(\sum_{i=1}^{L}OD_i\right)}{L\times\left(\sum_{i=1}^{L}\frac{F_i}{f_i}\right)-\left(\sum_{i=1}^{L}\sqrt{\frac{F_i}{f_i}}\right)^2}$$

$$W=\frac{\left(\sum_{i=1}^{L}OD_i\right)-V\times\left(\sum_{i=1}^{L}\sqrt{\frac{F_i}{f_i}}\right)}{L}.$$

13. A computer program storage medium containing a program for predicting a printing density, for use in a stencil printing in which a perforated stencil sheet is wound around a circumferential surface of a printing drum to which an ink is supplied, and the ink is transferred from the printing drum to a printing sheet through the perforated stencil sheet by pressing the printing sheet and the printing drum against each other while the drum is rotated, in which said program comprises the following steps of (a) measuring printing densities on at least two copies of print at corresponding printed portions thereof, said copies of print being obtained under different conditions of F/f, in which F is a pressing force at which the printing sheet is pressed to the drum and f is a rotation speed of the drum, (b) statistically processing said printing densities measured in the step (a), in order to obtain a function of printing density and F/f value, and (c) calculating a printing density at a desired pressing force and a desired rotation speed based on the function obtained in the step (b).

14. A computer program storage medium according to claim 13, in which said function obtained in the step (b) is indicated as follows:

$$OD=V\times\sqrt{(F/f)}+W$$

wherein OD means printing density, V and W mean constants.

15. A computer program storage medium according to claim 14, in which said V and W are calculated based on a least-squares method in accordance with the following equation:

$$V=\frac{L\times\sum_{i=1}^{L}\left(\sqrt{\frac{F_i}{f_i}}\times OD_i\right)-\left(\sum_{i=1}^{L}\sqrt{\frac{F_i}{f_i}}\right)\times\left(\sum_{i=1}^{L}OD_i\right)}{L\times\left(\sum_{i=1}^{L}\frac{F_i}{f_i}\right)-\left(\sum_{i=1}^{L}\sqrt{\frac{F_i}{f_i}}\right)^2}$$

-continued $$W=\frac{\left(\sum_{i=1}^{L}OD_i\right)-V\times\left(\sum_{i=1}^{L}\sqrt{\frac{F_i}{f_i}}\right)}{L}.$$

16. A computer program storage medium containing a program for calculating a printing condition, for use in a stencil printing in which a perforated stencil sheet is wound around a circumferential surface of a printing drum to which an ink is supplied, and the ink is transferred from the printing drum to a printing sheet through the perforated stencil sheet by pressing the printing sheet and the printing drum against each other while the drum is rotated, in which said program comprises the following steps of (a) measuring printing densities on at least two copies of print at corresponding printed portions thereof, said copies of print being obtained under different conditions of F/f, in which F is a pressing force at which the printing sheet is pressed to the drum and f is a rotation speed of the drum, (b) statistically processing said printing densities measured in the step (a), in order to obtain a function of printing density and F/f value, and (c) calculating a combination of a pressing force and a rotation speed at a desired printing density based on the function obtained in the step (b).

17. A computer program storage medium according to claim 16, in which said function obtained in the step (b) is indicated as follows:

$$OD=V\times\sqrt{(F/f)}+W$$

wherein OD means printing density, V and W mean constants.

18. A computer program storage medium according to claim 17, in which said V and W are calculated based on a least-squares method in accordance with the following equation:

$$V=\frac{L\times\sum_{i=1}^{L}\left(\sqrt{\frac{F_i}{f_i}}\times OD_i\right)-\left(\sum_{i=1}^{L}\sqrt{\frac{F_i}{f_i}}\right)\times\left(\sum_{i=1}^{L}OD_i\right)}{L\times\left(\sum_{i=1}^{L}\frac{F_i}{f_i}\right)-\left(\sum_{i=1}^{L}\sqrt{\frac{F_i}{f_i}}\right)^2}$$

$$W=\frac{\left(\sum_{i=1}^{L}OD_i\right)-V\times\left(\sum_{i=1}^{L}\sqrt{\frac{F_i}{f_i}}\right)}{L}.$$

* * * * *